United States Patent
Carlson

(10) Patent No.: US 7,516,807 B2
(45) Date of Patent: Apr. 14, 2009

(54) DUAL-PUMP FLUID DISTRIBUTION SYSTEM FOR A HYBRID ELECTRIC VEHICLE

(75) Inventor: Richard W. Carlson, Warren, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 552 days.

(21) Appl. No.: 11/347,010

(22) Filed: Feb. 3, 2006

(65) Prior Publication Data
US 2007/0240919 A1    Oct. 18, 2007

(51) Int. Cl.
*B60K 6/00* (2007.10)
*B60K 1/00* (2006.01)
*B60K 17/00* (2006.01)
*B60K 17/10* (2006.01)

(52) U.S. Cl. .............. 180/165; 180/65.2; 180/305; 180/306; 180/307; 180/367

(58) Field of Classification Search .......... 180/165, 180/65.2, 305, 306, 307, 367
See application file for complete search history.

(56) References Cited

U.S. PATENT DOCUMENTS

| | | | | |
|---|---|---|---|---|
| 6,527,074 B1 * | 3/2003 | Morishita | ............... | 180/65.1 |
| 6,739,305 B2 * | 5/2004 | Takahara et al. | ........ | 123/196 R |
| 6,786,183 B2 * | 9/2004 | Hoelle et al. | ............. | 123/41.44 |
| 7,111,704 B2 * | 9/2006 | Johnson | ...................... | 180/307 |

* cited by examiner

*Primary Examiner*—Christopher P Ellis
*Assistant Examiner*—John R Olszewski

(57) ABSTRACT

The dual-pump fluid distribution system of the present invention preferably includes a sump having hydraulic fluid disposed therein. A first pump driven by an electric motor and a second pump driven by an engine are disposed in fluid communication with the sump. A plurality of vehicle systems are disposed in fluid communication with the first and second pumps. The first pump is configured to transfer hydraulic fluid to the vehicle systems when the engine is off. The first and second pumps are both configured to transfer hydraulic fluid to the vehicle systems when the engine speed is at or below a predetermined value. The second pump is configured to transfer hydraulic fluid to the vehicle systems when the engine speed exceeds the predetermined value. Accordingly, the hydraulic pressure needs of the vehicle systems are met for any given engine speed. A corresponding method in accordance with the present invention is similarly provided.

16 Claims, 1 Drawing Sheet

DUAL-PUMP FLUID DISTRIBUTION SYSTEM FOR A HYBRID ELECTRIC VEHICLE

TECHNICAL FIELD

The present invention pertains generally to a dual-pump fluid distribution system for a hybrid electric vehicle.

BACKGROUND OF THE INVENTION

Conventional transmission pumps are driven by output from the engine for purposes such as meeting the cooling, lubrication and pressure needs of a transmission. When the engine is off or operating at low speeds; however, it may be impractical to meet such lubrication, cooling and pressure needs with an engine driven pump. Therefore, an additional pump driven by an electric motor may be implemented to provide lubrication, cooling and/or pressure when the engine is off or running at low speeds.

SUMMARY OF THE INVENTION

The dual-pump fluid distribution system of the present invention preferably includes a sump having hydraulic fluid disposed therein. A first pump driven by an electric motor and a second pump driven by an engine are disposed in fluid communication with the sump. A plurality of vehicle systems are disposed in fluid communication with the first and second pumps. The first pump can transfer hydraulic fluid to the vehicle systems when the engine is off. The first and second pumps can together transfer hydraulic fluid to the vehicle systems when the engine speed is at or below a predetermined value. The second pump can transfer hydraulic fluid to the vehicle systems when the engine speed exceeds the predetermined value. Accordingly, the hydraulic pressure needs of the vehicle systems are met for any given engine speed.

The second pump may be configured to selectively back-drive the first pump by transferring hydraulic fluid therethrough.

The dual-pump fluid distribution system of the present invention may also include a generator operatively connected to the first pump wherein the generator is configured to generate electricity when the first pump is back-driven.

The dual-pump fluid distribution system of the present invention may also include a battery operatively connected to the generator, wherein the battery is configured to store electricity from the generator.

The dual-pump fluid distribution system of the present invention may also include a blow-off valve in fluid communication with the second pump, wherein the blow-off valve is configured to transfer excess hydraulic fluid back to the sump and thereby maintain a predetermined desired pressure level.

The dual-pump fluid distribution system of the present invention may also include a pressure sensor in fluid communication with the first pump, wherein the pressure sensor is configured to monitor the pressure level of hydraulic fluid transferred to one or more of the vehicle systems.

The dual-pump fluid distribution system of the present invention may also include a control module operatively connected to the pressure sensor and the electric motor, wherein the control module is configured to run the electric motor at a speed calculated to power the primary pump and thereby bring the monitored pressure level up to a predetermined desired pressure level.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
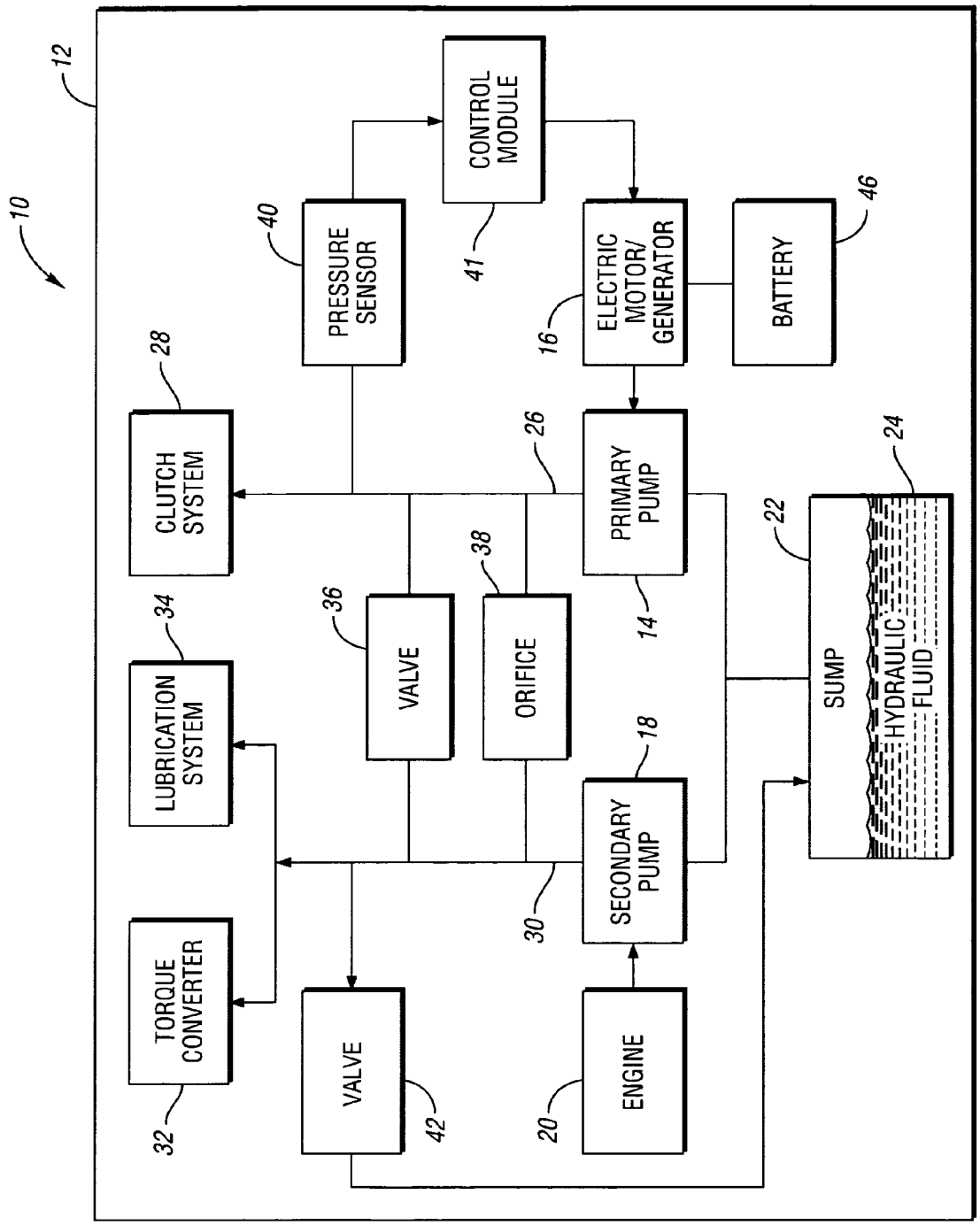
FIG. 1 is a schematic illustration of a dual-pump fluid distribution system for a hybrid electric vehicle.

Referring to the drawings wherein like characters represent the same or corresponding parts through the several views, there is shown in FIG. 1 a schematic representation of a hybrid electric vehicle 10 having a dual-pump fluid distribution system 12. The fluid distribution system 12 is adapted to transfer fluid to one or more vehicle systems such as, for example, a clutch system 28 and a lubrication system or circuit 34. The fluid distribution system 12 includes a primary pump 14 operatively connected to and driven by an electric motor/generator 16. The fluid distribution system 12 also includes a secondary pump 18 operatively connected to and driven by an internal combustion engine 20. According to the preferred embodiment of the present invention, the pumps 14, 18 are fixed displacement pumps; however, alternate pump configurations may be envisioned as will be described in detail hereinafter.

The primary pump 14 draws hydraulic fluid 24 from a sump 22 and transfers it to a clutch feed channel 26. The clutch feed channel 26 is in fluid communication with the clutch system 28. The clutch system 28 generally includes a plurality of solenoid controlled valves (not shown) and a plurality of clutches (not shown). The clutch system 28 receives pressurized hydraulic fluid 24 from the clutch feed channel 26 in order to selectively engage a plurality of different gear speed ratios.

The secondary pump 18 draws hydraulic fluid 24 from the sump 22 and transfers it to a torque converter (TC) feed channel 30. The TC feed channel 30 is in fluid communication with a torque converter 32 and with the lubrication circuit 34. The TC 32 is a conventional device that is hydraulically actuatable with pressurized hydraulic fluid 24 from the TC feed channel 30. The lubrication circuit 34 preferably includes a plurality of channels configured to transfer hydraulic fluid 24 to predetermined areas requiring lubrication.

The clutch feed channel 26 and the TC feed channel 30 are interconnected via a valve 36 and an orifice 38. The valve 36 is preferably a by-pass valve configured to open when the pressure in the TC feed channel 30 exceeds the pressure in the clutch feed channel 26. Correspondingly, the valve 36 is configured to close when the pressure in the clutch feed channel 26 is greater than or equal to the pressure in the TC feed channel 30. The orifice 38 is of a predetermined size configured to allow the transmission of hydraulic fluid between the clutch feed channel 26 and the TC feed channel 30.

The fluid distribution system 12 preferably includes a pressure sensor 40 disposed between the primary pump 14 and the clutch system 28, and is configured to monitor the pressure of the hydraulic fluid 24 in the clutch feed channel 26. The pressure sensor 40 is further configured to transmit a signal indicative of the monitored pressure level to a control module 41 which is operatively connected to the electric motor/generator 16 as will be described in detail hereinafter.

The fluid distribution system 12 preferably includes a valve 42 in fluid communication with the TC feed channel 30. The valve 42 is preferably a conventional blow-off valve adapted to bleed off excess pressure in the TC feed channel 30 before it reaches either the torque converter 32 or the lubrication circuit 34. The valve 42 limits the pressure of the hydraulic fluid 24 entering the torque converter 32 and the lubrication circuit 34 to a predetermined value by transferring excess hydraulic fluid 24 from the TC feed channel 30 back to the sump 22.

Having described the apparatus of the present invention hereinabove, the preferred method of the present invention will now be described. The method differs depending upon the mode of operation of the hybrid vehicle 10. For illustrative purposes, mode 1 will be defined as an operational mode wherein the vehicle 10 is stopped and the engine speed of the hybrid vehicle 10 is zero RPM, mode 2 will be defined as an operational mode wherein the engine speed of the hybrid vehicle 10 is low (i.e., between 0 and 1,000 RPM), and mode 3 will be defined as an operational mode wherein the engine speed of the hybrid vehicle 10 is high (i.e., greater than 1,000 RPM). It should, however, be appreciated that the modes may defined differently as required to meet the needs of a particular application.

When the hybrid vehicle 10 is operating in mode 1, the engine 20 is off and cannot power the secondary pump 18. Therefore, in mode 1, the primary pump 14 is operative to transfer pressurized hydraulic fluid 24 to the TC 32, the lubrication circuit 34, and the clutch system 28 as will be described in detail hereinafter.

The transfer of pressurized hydraulic fluid 24 to the TC 32 and the lubrication circuit 34 when the hybrid vehicle 10 is operating in mode 1 is accomplished in the following manner. The primary pump 14 powered by the electric motor/generator 16 draws hydraulic fluid 24 from the sump 22 and provides pressurized hydraulic fluid 24 to the clutch feed channel 26. A predetermined amount of the pressurized hydraulic fluid 24 in the clutch feed channel 26 is transferred to the TC feed channel 30 via the orifice 38. The amount of hydraulic fluid 24 transferred through the orifice 38 can be varied by altering the size of the orifice 38 as required to meet the needs of a particular application. The hydraulic fluid 24 in the TC feed channel 30 is then transferred to the TC 32 and to the lubrication circuit 34. As the TC 32 is generally not applied while the vehicle is stopped and there are fewer moving parts requiring lubrication, only a small amount of hydraulic fluid 24 is transferred to the TC 32 and lubrication circuit 34.

The transfer of pressurized hydraulic fluid 24 to the clutch system 28 when the hybrid vehicle 10 is operating in mode 1 is accomplished in the following manner. The primary pump 14 powered by the electric motor/generator 16 draws hydraulic fluid 24 from the sump 22 and provides pressurized hydraulic fluid 24 to the clutch feed channel 26. Although the primary pump 14 is preferably a fixed displacement pump, a commanded pressure level is obtainable by regulating the electric motor/generator 16 output. The pressure sensor 40 monitors the current pressure level in the clutch feed channel 26. If the current pressure level in the clutch feed channel 26 differs significantly from the commanded pressure level, the control module 41 can alter the output of the electric motor/generator 16 such that the current pressure level more closely approximates the commanded pressure level. The pressurized and regulated hydraulic fluid 24 in the clutch feed channel 26 is then transferred to the clutch system 28 to meet any pressure requirements thereof.

When the hybrid vehicle 10 is operating in mode 2, the engine 20 is operating at low speeds such that the engine driven secondary pump 18 may not meet the needs of the TC 32 and the lubrication circuit 34. Therefore, in mode 2, the TC 32 and the lubrication circuit 34 receive hydraulic fluid 24 from both the primary pump 14 and the secondary pump 18 as will be described in detail hereinafter.

The transfer of pressurized hydraulic fluid 24 to the TC 32 and the lubrication circuit 34 when the hybrid vehicle 10 is operating in mode 2 is accomplished in the following manner. The secondary pump 18 powered by the engine 20 transfers hydraulic fluid 24 from the sump 22 to the TC feed channel 30, and then to the TC 32 and the lubrication circuit 34. As the secondary pump 18 is being powered by the engine 20 and the engine 20 is running at low speeds, the secondary pump 18 may not produce enough output to meet the needs of the TC 32 and the lubrication circuit 34. Therefore, the primary pump 14 supplements the transfer of hydraulic fluid 24 to the TC 32 and the lubrication circuit 34. More precisely, the primary pump 14 transfers supplemental hydraulic fluid 24 from the sump 22, through the clutch feed channel 26, through the orifice 38, through the TC feed channel 30 and then to both the torque converter 32 and the lubrication circuit 34. If the pressure of the hydraulic fluid 24 provided by the pumps 14, 18 exceeds a predetermined limit, excess hydraulic fluid 24 is bled off by the valve 42 and is transferred back to the sump 22.

The transfer of pressurized hydraulic fluid 24 to the clutch system 28 when the hybrid vehicle 10 is operating in mode 2 is accomplished in the same manner as that described hereinabove during mode 1 operation.

As an example of mode 2 operation, assume the TC 32 and the lubrication circuit 34 together require hydraulic fluid 24 at 60 psi of pressure, and the clutch system 28 requires hydraulic fluid 24 at 150 psi of pressure. Since the engine 20 is operating at low speed (e.g., 600 RPM), the secondary pump 18 only produces 40 psi of pressurized hydraulic fluid 24. According to the example, the control module 41 would run the electric motor/generator 16 at a speed calculated to power the primary pump 14 and produce 150 psi of pressurized hydraulic fluid 24. The secondary pump 18 would transfer 40 psi of pressurized hydraulic fluid 24 to the TC 32 and the lubrication circuit 34, and the primary pump 14 would transfer 20 psi of pressurized hydraulic fluid 24 to the TC 32 and the lubrication circuit 34 through the orifice 38. The pressure sensor 40 will then send the control module 41 a signal indicating that the measured pressure level in the clutch feed channel 26 is less than 150 psi since some of the hydraulic fluid 24 from the primary pump 14 was transferred to the TC 32 and the lubrication circuit 34. Therefore, the control module 41 will run the electric motor/generator 16 at a speed calculated to power the primary pump 14 and thereby produce additional pressurized hydraulic fluid 24 such that the total pressure transferred to the clutch system 28 is 150 psi.

When the hybrid vehicle 10 is operating in mode 3, the engine 20 is operating at high speeds such that the engine driven secondary pump 18 generally provides more hydraulic fluid 24 than is needed for TC 32 and the lubrication circuit 34. Therefore, in mode 3, excess hydraulic fluid 24 from the secondary pump 18 is transferred to meet the needs of the clutch system 28 as will be described in detail hereinafter.

The transfer of pressurized hydraulic fluid 24 to the TC 32 and the lubrication circuit 34 when the hybrid vehicle 10 is operating in mode 3 is accomplished in the following manner. The secondary pump 18 powered by the engine 20 transfers hydraulic fluid 24 from the sump 22 to the TC feed channel 30, and then to the TC 32 and the lubrication circuit 34. As the secondary pump 18 is being powered by the engine 20 and the engine 20 is running at high speeds, the secondary pump 18 generally produces more than enough output to meet the needs of the TC 32 and the lubrication circuit 34. If the secondary pump 18 output exceeds the requirements for the TC 32 and the lubrication circuit 34, excess hydraulic fluid 24 is transferred to the clutch system 28 via the valve 36 as will be described in detail hereinafter. If the secondary pump 18 output exceeds the requirements for the TC 32, the lubrication circuit 34, and the clutch system 28, excess hydraulic fluid 24 can be bled off via the valve 42 and transferred back to the sump 22.

The transfer of pressurized hydraulic fluid 24 to the clutch system 28 when the hybrid vehicle 10 is operating in mode 3 is accomplished in the following manner. After the secondary pump 18 provides enough hydraulic fluid 24 to meet the requirements of the TC 32 and the lubrication circuit 34, any additional hydraulic fluid 24 may be transferred to the clutch system 28. More precisely, the additional hydraulic fluid 24 is transferred by the secondary pump 18 from the TC feed channel 30, through the valve 36, into the clutch feed channel 26 and to the clutch system 28. The valve 36 is preferably a by-pass valve that is automatically opened when the pressure from the secondary pump 18 exceeds the pressure from the primary pump 14. Alternatively, the valve 36 may be controlled in any known manner.

The pressure level of the hydraulic fluid 24 transferred by the secondary pump 18 into the clutch feed channel 26 is monitored by the pressure sensor 40. The pressure sensor 40 sends a signal indicative of the current pressure level to the control module 41. The control module 41 then runs the electric motor/generator 16 at a speed calculated to power the primary pump 14 and bring the current pressure level up to a predetermined commanded pressure level such that the pressure needs of the clutch system 28 are met.

As an example of mode 3 operation, assume the TC 32 and the lubrication circuit 34 together require hydraulic fluid 24 at 60 psi of pressure, and the clutch system 28 requires hydraulic fluid 24 at 150 psi of pressure. Since the engine is operating at high speed (e.g., 2000 RPM), the secondary pump 18 produces 200 psi. According to the example, the control module 41 would run the electric motor/generator 16 at a speed calculated to power the primary pump 14 and produce 150 psi of pressurized hydraulic fluid 24. Since the pressure output of the secondary pump 18 is greater than the pressure output from the primary pump 14, valve 36 opens allowing one way, unrestricted flow from the TC feed channel 30 to the clutch feed channel 26. The pressure sensor 40 will then send the control module 41 a signal indicating that the measured pressure level in the clutch feed channel 26 is greater than 150 psi. Therefore, the control module 41 will run the electric motor/generator 16 at a speed calculated to reduce the pressurized hydraulic fluid 24 from the primary pump 14 such that the total pressure transferred to the clutch system 28 is 150 psi.

According to an alternate embodiment, if the secondary pump 18 transfers more pressurized hydraulic fluid 24 than is required for the torque converter 32, the lubrication circuit 34 and the clutch system 28, the additional pressurized hydraulic fluid can be transferred back to the sump 22 in the following manner. The additional pressurized hydraulic fluid 24 is transferred by the secondary pump 18 from the TC feed channel 30, through the valve 36, into the clutch feed channel 26, through the primary pump 14 and into the sump 22. The transfer of hydraulic fluid 24 through the primary pump 14 back-drives the pump 14 (i.e., spins the pump 14 in a reverse direction). The motor/generator 16 converts the rotational energy of the back-driven pump 14 into electricity which is preferably stored in a conventional storage device such as the battery 46.

According to another alternate embodiment, the secondary pump 18 may be a variable displacement pump. A pressure regulator valve (not shown) is implemented to control the output of the variable displacement secondary pump 18 and thereby produce a desired pressure and flow of hydraulic fluid 24. Since the output of the variable displacement secondary pump 18 is controllable, there is no excess hydraulic fluid 24 which must be transferred through the primary pump 14 (i.e., the primary pump 14 is never back-driven). Accordingly, a one-way valve (not shown) is preferably disposed at the inlet of the primary pump 14 to prevent the transfer of hydraulic fluid 24 therethrough.

While the best modes for carrying out the invention have been described in detail, those familiar with the art to which this invention relates will recognize various alternative designs and embodiments for practicing the invention within the scope of the appended claims.

The invention claimed is:

1. A dual-pump fluid distribution system for a hybrid electric vehicle comprising:
    a sump having hydraulic fluid disposed therein;
    a first pump in fluid communication with said sump, said first pump driven by an electric motor;
    a second pump in fluid communication with said sump, said second pump driven by an engine; and
    a plurality of vehicle systems in fluid communication with said first and second pumps;
    wherein hydraulic fluid is transferable from the first pump to the plurality of vehicle systems when the engine is off, hydraulic fluid is transferable from both the first and second pumps to the plurality of vehicle systems when the engine speed is at or below a predetermined value, and hydraulic fluid is transferable from the second pump to the plurality of vehicle systems when the engine speed exceeds the predetermined value such that the hydraulic pressure needs of the vehicle systems are met at any given engine speed.

2. The dual-pump fluid distribution system of claim 1, wherein said first and second pumps are fixed displacement pumps.

3. dual-pump fluid distribution system of claim 2, wherein said second pump is configured to selectively back-drive the first pump by transferring hydraulic fluid therethrough.

4. The dual-pump fluid distribution system of claim 3, further comprising a generator operatively connected to the first pump, said generator configured to generate electricity when said first pump is back-driven.

5. The dual-pump fluid distribution system of claim 4, further comprising a battery operatively connected to the generator, said battery being configured to store electricity from the generator.

6. The dual-pump fluid distribution system of claim 1, further comprising a blow-off valve in fluid communication with the second pump, said blow-off valve being configured to transfer excess hydraulic fluid back to the sump and thereby maintain a predetermined desired pressure level.

7. The dual-pump fluid distribution system of claim 1, further comprising a pressure sensor in fluid communication with the first pump, said pressure sensor configured to monitor the pressure level of hydraulic fluid transferred to one or more of said plurality of vehicle systems.

8. The dual-pump fluid distribution system of claim 6, further comprising a control module operatively connected to the pressure sensor and the electric motor, said control module configured to run the electric motor at a speed calculated to power the second pump and thereby bring the monitored pressure level up to a predetermined desired pressure level.

9. The dual-pump fluid distribution system of claim 1, wherein said first pump is a fixed displacement pump and said second pump is a variable displacement pump.

10. The dual-pump fluid distribution system of claim 1, wherein said vehicle systems include a clutch system and a lubrication system.

11. A dual-pump fluid distribution system for a hybrid electric vehicle comprising:
a sump having hydraulic fluid disposed therein;
a first pump in fluid communication with said sump, said first pump driven by an electric motor;
a second pump in fluid communication with said sump, said second pump driven by an engine;
a clutch system in fluid communication with the first pump;
a lubrication system in fluid communication with the second pump;
a valve in fluid communication with both said first and second pumps, said valve being configured to selectively transfer hydraulic fluid from the second pump to the clutch system; and
an orifice in fluid communication with both said first and second pumps, said orifice being configured to transfer hydraulic fluid from the first pump to the lubrication system;
wherein hydraulic fluid is transferable from one or both of the first pump and the second pump to meet the hydraulic fluid requirements of the clutch system and the lubrication system.

12. The dual-pump fluid distribution system of claim 11, further comprising a torque converter in fluid communication with the first pump and the second pump, wherein hydraulic fluid is transferable from one or both of the first pump and the second pump to meet the hydraulic fluid requirements of the torque converter.

13. The dual-pump fluid distribution system of claim 11, wherein said first and second pumps are fixed displacement pumps.

14. The dual-pump fluid distribution system of claim 13, wherein said second pump is configured to selectively back-drive the first pump by transferring hydraulic fluid therethrough.

15. The dual-pump fluid distribution system of claim 14, further comprising a generator operatively connected to the first pump, said generator configured to generate electricity when said first pump is back-driven.

16. The dual-pump fluid distribution system of claim 15, further comprising a battery operatively connected to the generator, said battery being configured to store electricity from the generator.

* * * * *